United States Patent [19]

Willgoose

[11] 4,434,835

[45] Mar. 6, 1984

[54] METHOD OF MAKING A BLADE AEROFOIL FOR A GAS TURBINE ENGINE

[75] Inventor: Kenneth Willgoose, Findern, England

[73] Assignee: Rolls-Royce Limited, London, England

[21] Appl. No.: 356,506

[22] Filed: Mar. 9, 1982

[30] Foreign Application Priority Data

Mar. 25, 1981 [GB] United Kingdom ................. 8109314

[51] Int. Cl.³ .......................... B22C 7/02; B22C 9/04
[52] U.S. Cl. ......................................... 164/34; 164/35; 164/36; 164/516; 164/45
[58] Field of Search ...................................... 164/34–36, 164/45, 8, 516–519

[56] References Cited

U.S. PATENT DOCUMENTS 4,384,607   5/1983   Wood et al. ........................... 164/34

FOREIGN PATENT DOCUMENTS 2017550   10/1979   United Kingdom ................. 164/35

Primary Examiner—Kuang Y. Lin
Attorney, Agent, or Firm—Cushman, Darby & Cushman

[57] ABSTRACT

A method of making at least the aerofoil of a blade for a gas turbine engine in which the cooling air exit passages, whether at the trailing edge or in other parts of the aerofoil, are cast rather than machined subsequently. In the method a disposable piece is formed with holes of the shape of the holes eventually required in the blade aerofoil. The piece is placed in a die and used to define part of the ceramic core required in the casting process, the die being arranged to produce a channel portion interconnecting the otherwise free ends of the parts of the core which will form the passages. The ceramic core thus formed in a lost-wax casting process to form the blade aerofoil, the channel portion being embedded in the shell mould to support the parts which define the passages.

7 Claims, 9 Drawing Figures

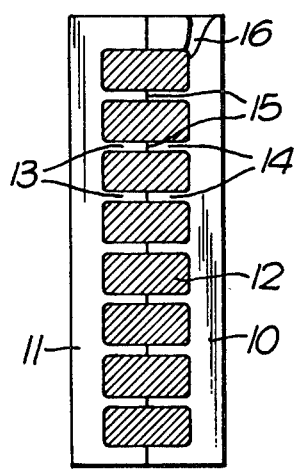
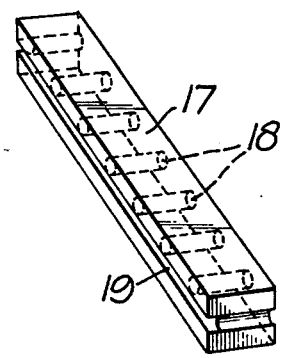
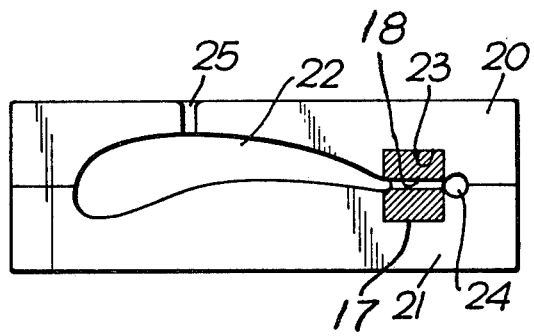
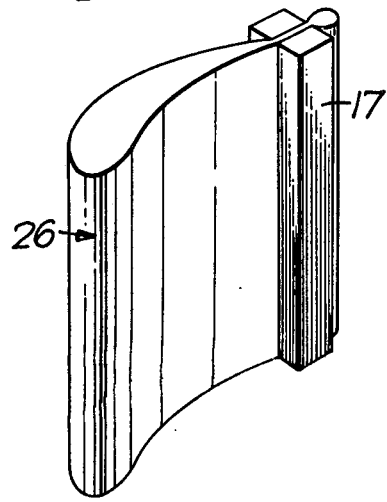
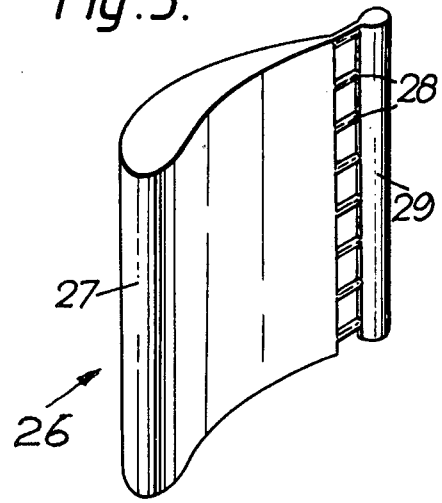

METHOD OF MAKING A BLADE AEROFOIL FOR A GAS TURBINE ENGINE

This invention relates to a method of making a blade aerofoil for a gas turbine engine.

It is currently common practice to use the lost wax casting process in conjunction with ceramic cores to produce cast blade aerofoils with accurate external shapes and with complex interior configurations of cooling chambers and passages. However, there still remain certain features which are difficult to produce in the casting process. One such feature comprises the very narrow passages through which cooling air is allowed to flow to the surface of the blade, either as film cooling air or simply as an ejection of spent cooling air from the trailing edge of the aerofoil. At present these passages are usually formed in a machining operation after the blade has been cast, which increases the cost of the blade.

The factors which have prevented the direct casting of these features include the difficulty of making the very small ceramic cores necessary without breaking them on removal from a mould, and the fragility of the cores leading to breakage in the metal pouring step.

The present invention provides a method of making the blade aerofoil in which such narrow passages may be cast using a technique which alleviates these problems.

According to the present invention a method of making a blade aerofoil for a gas turbine engine includes the steps of forming a disposable piece having holes therein of the same form as the exit passages, locating the disposable piece in a die having a first internal cavity portion of the shape of the cavity within the blade aerofoil with which the passages will communicate, a second cavity portion in which fits the disposable piece, and a third cavity portion providing a channel interconnecting the free ends of the holes in the disposable piece, injecting ceramic slurry to fill the three cavity portions, hardening or allowing the ceramic to harden, separating the parts of the die, removing the ceramic core thus formed from the die, removing the disposable piece from the ceramic, placing the ceramic core thus formed in a further multi-part die having a main internal cavity whose form is substantially that of the external surface of the blade aerofoil and a secondary cavity within which the ceramic form from said channel portion fits, injecting wax to fill the cavity within the die, allowing the wax to solidify, removing the wax pattern thus formed from the die, forming a shell of ceramic on the outer surface of the pattern, the ceramic shell engaging with the channel portion of the ceramic core, removing the wax from the ceramic shell, pouring molten metal into the shell mould thus formed, allowing the metal to solidify and removing the ceramic mould and core from the cast blade aerofoil.

The disposable piece may itself be made in a multi-part die, and the holes in it may be formed by pins which extend from the die parts to abut at the joint plane. The holes may thus be straight or otherwise shaped.

The disposable piece may be disposable by heating, or by dissolution, or by chemical attack.

The invention will now be particularly described, merely by way of example, with reference to the accompanying drawings in which:

FIG. 1 is a section through a multi-part die for a disposable piece,

FIG. 2 is a perspective view of the piece formed in the die of FIG. 1,

Figure 7:
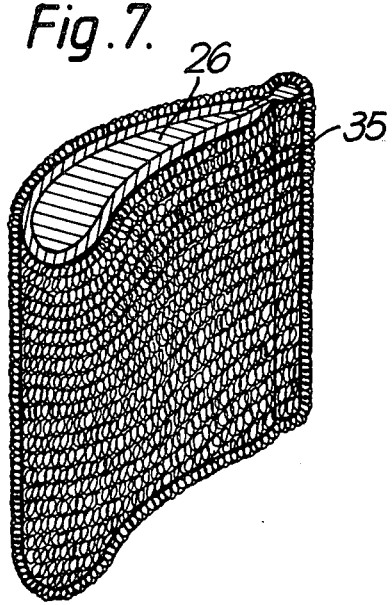
Figure 8:
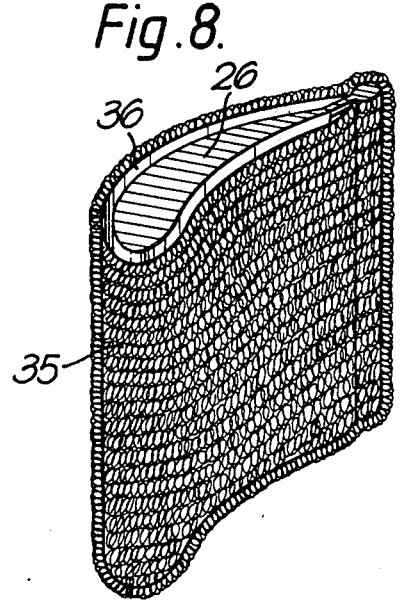
Figure 9:
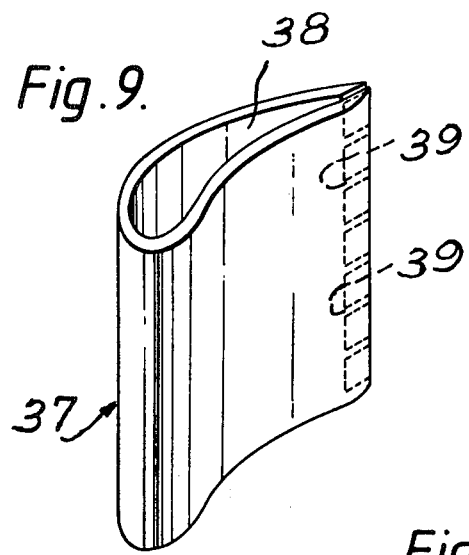
Figure 6:
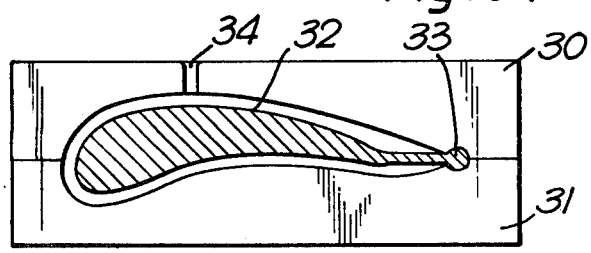

FIG. 3 is a section through a further multi-part die in which the disposable piece of FIG. 2 is located, FIG. 4 shows a ceramic core made in the die of FIG. 3 and with the disposable piece still attached, FIG. 5 shows the core of FIG. 4 after the disposable piece has been removed, FIG. 6 is a section through a further multi-part die in which the core of FIG. 5 is used, FIG. 7 shows the wax pattern made in the die of FIG. 6 having a shell of ceramic thereon and in which the core of FIG. 5 is embedded, FIG. 8 shows the shell mould left when the coated wax pattern of FIG. 7 has the wax removed, and, FIG. 9 shows the completed blade aerofoil made in the mould of FIG. 8.

In FIG. 1 there is shown a composite mould consisting of the two parts 10 and 11 which between them define a substantially rectangular cavity 12. Pluralities of pins 13 and 14 extend from the parts 10 and 11 respectively and meet at the joint plane 15 of the die parts to provide, in effect, pins extending across the cavity 12. A sprue passage 16 is provided to allow disposable material to be injected into the cavity 12.

To use the die, the disposable material which may for instance comprise a thermoplastic or a water soluble resin is injected through the space passage in fluid form so as to fill the cavity 12 completely. The material is then caused or allowed to harden; if the material is thermoplastic it can simply be allowed to cool and it will then harden but otherwise heat may be needed to be applied to cause the material to harden.

Once the disposable material is hard, it can be removed from the die by splitting and separating the die into its two halves 10 and 12 and thus withdrawing the pins 13 and 14. The disposable piece thus formed is shown in FIG. 2 and is seen to comprise a substantially rectangular block 17 with a plurality of holes 18 extending between opposed long faces of the block. One face is also provided with a longitudinal indentation at 19 which will eventually form the extreme trailing edge portion of the ceramic core to be made using the disposable blade 17. It may be necessary to destroy flashing left between the abutting ends of the pins 13 and 14 at the joint plane 15.

The block 17 is then transferred to a second two-part die shown in FIG. 3. Here the die is formed as two pieces 20 and 21, and although the pieces between them define a single cavity, this cavity can be regarded as being made up of three cavity portions 22, 23 and 24. The main cavity portion 22 has the shape which is required for the internal cooling air cavity within the blade aerofoil and runs into the second portion 23 which is shaped to fit closely round the block 17. The block 17 is positioned in the cavity 23 so that its indentation 19 forms a continuation of the cavity portion 22 and leads into the holes 18 which then communicate with the third cavity portion 24. This third portion comprises a channel which interconnects the free ends of all the holes 18 and its main purpose is to form a part of the core which will strengthen the fragile part of the ceramic core which will form the passages in the blade aerofoil.

The die part 20 has a sprue passage 25 through which a ceramic slurry may be injected to fill the cavity 22, the holes 18 and thus the cavity 24. The ceramic slurry may include a water soluble resin which will cause it to harden off to a 'green' condition once the injection phase is complete, but in any case it is necessary that the ceramic should harden to form a solid core. This core 26 is then removed from the die by separating the two halves 20 and 21. It will be seen from FIG. 4 that the block 17 still forms part of the core at this stage, and it performs a necessary function in that it supports the inevitably fragile parts of the ceramic core 26 against the stresses involved in separating the core from the die halves 20 and 21.

The core 26 is next fired to sinter the ceramic material, and in the same or a separate step the block of disposable material 17 is removed from the ceramic. If the disposable material is thermoplastic or inflamable the firing step will also destroy the disposable block; therein a solvent process or whatever is appropriate is used to remove the blocks. The finished core is shown in FIG. 5, and will be seen to comprise a main part 27, a series of fine ceramic 'pins' 28 and a channel portion 29 which interconnects the free ends of the 'pins' 28 to form a kind of 'ladder' structure.

The cover may then need to be dressed to remove any flashing which is present; this may for instance occur at the junction between the indentation 19 and the cavity portion 22. It will be seen that this flashing which will appear on the main part 27 of the core is relatively easily dealt with. If an attempt is made to form the pins 28 in a die without the use of the block 17 is it likely that flashing will exist, and may be needed for strength purposes, between the pins 28. This type of flashing is very difficult to remove without damaging the pins.

The finished core is then mounted in a third two-part die made up of parts 30 and 31. Those parts define a cavity 32 whose shape is that of the finished aerofoil but which also has a channel portion at 33 within which the corresponding portion 29 of the core fits. The core is held in the die as shown in FIG. 6 and molten wax is injected under pressure through the sprue passage 34 to fill that part of the cavity 32 not occupied by the core 26. This is shown as comprising an aerofoil shaped wall of substantially constant thickness surrounding the core.

The molten wax is next allowed to cool and solidify and is removed from the die, again by separating the die halves. The wax pattern thus formed is then provided with a ceramic shell 35 on its outer surface as shown in FIG. 7. This is carried out by a series of steps in which the pattern is dipped in a ceramic slurry and the dipped pattern is then coated with particulate ceramic by a 'raining' or stuccoing process. These steps are repeated until a sufficient thickness of ceramic shell is built up and the shelled pattern is allowed to dry. It will be seen that because the channel section 33 of the core is not covered with wax in the wax injection step, this section is exposed to the ceramic shell material and it keys firmly into the shell.

The shelled wax pattern is next treated to remove the wax and to fire the ceramic shell. It is possible to achieve both these objects in a single heating process, since the wax will of course melt when heated. However, as is well known in the art, it is necessary to take steps to ensure that the expansion of the wax does not crack the ceramic shell. FIG. 8 shows the fired shell mould 35. It will be seen that between the core 26, which is unaffected by the firing step, and the shell 35 there is a cavity 36 of the same shape as the wax pattern.

Into this cavity 36 molten metal is poured to fill the cavity and is then allowed to solidify. In this step the loads on the ceramic core can be quite considerable, but the support of the pins 28 from the main part 27 of the core and from the channel section 29 helps them to resist these loads. Once the metal has solidified, the ceramic shell mould 35 and the core 26 can be removed from the metal aerofoil. The shell is normally removed by mechanical means, but since the core is embedded in the metal it is necessary to leach it out chemically, using hot caustic soda or other reagent.

The finished cast blade aerofoil is shown in FIG. 9, where it will be seen that the process has produced a hollow aerofoil 37 having an internal cavity 38 and cooling air exit holes 39 connecting the cavity 38 with the trailing edge of the aerofoil so that cooling air from the cavity may be ejected at the trailing edge. The aerofoil is then ready for any finishing required and can if necessary be provided with platforms, a shank and a root as desired.

Although described above as used to make only the aerofoil of the blade, it is of course possible to cast the other parts of the blade integrally with the aerofoil. Again, the method of the invention is very suitable for making the trailing edge ejection holes described but it could be used for other holes, such as film cooling holes, in the aerofoil. It will also be noted that the description above relates to a very simple aerofoil with a single large cavity within it. This has been done to simplify the embodiment so that the invention may be more easily understood, however, in practice it is likely that the interior configuration of the aerofoil will be much more complex.

I claim:

1. A method of making a blade aerofoil for a gas turbine engine, the aerofoil having cooling air exit passages therein, including the steps of forming a disposable piece having holes therein of the same form as the exit passages, locating the disposable piece in a die having a first internal cavity portion of the shape of the cavity within the blade aerofoil with which the passages will communicate, a second cavity portion in which fits the disposable piece, and a third cavity portion providing a channel interconnecting the free ends of the holes in the disposable piece, injecting ceramic slurry to fill the three cavity portions, hardening or allowing the ceramic to harden, separating the parts of the die, removing the ceramic core thus formed from the die, removing the disposable piece from the ceramic, placing the ceramic core thus formed in a further multi-part die having a main cavity whose form is substantially that of the external surface of the blade aerofoil and a secondary cavity within which the ceramic form from said channel portions fits, injecting wax to fill the main cavity within the die, allowing the wax to solidify, removing the wax pattern thus formed from the die, forming a shell of ceramic on the outer surface of the pattern, the ceramic shell engaging with the channel portion of the ceramic core, removing the wax from the ceramic shell, pouring molten metal into the shell mould thus formed, allowing the metal to solidify and removing the ceramic mould and the core from the cast blade aerofoil.

2. A method as claimed in claim 1 and in which the step of forming the disposable piece is carried out by injection moulding in a multi-piece die.

3. A method as claimed in claim 2 and in which said holes are formed by pins extending across the die cavity from each of said parts, the pins from one part abutting at their ends the pins from the outer part.

4. A method as claimed in claim 3 and in which said pins are straight.

5. A method as claimed in claim 1 and in which the material of the disposable piece is chosen to be disposable by heating.

6. A method as claimed in claim 1 and in which the material of the disposable piece is chosen to be disposable by dissolution.

7. A method as claimed in claim 1 and in which the material of the disposable piece is chosen to be disposable by chemical attack.

* * * * *